US010681197B2

(12) United States Patent
Zhao et al.

(10) Patent No.: US 10,681,197 B2
(45) Date of Patent: Jun. 9, 2020

(54) CALL PROCESSING METHOD AND MOBILE TERMINAL

(71) Applicant: Huawei Technologies Co., Ltd., Shenzhen (CN)

(72) Inventors: Jinlong Zhao, Beijing (CN); Zhanmin Ren, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/090,050

(22) PCT Filed: Mar. 31, 2016

(86) PCT No.: PCT/CN2016/077954
§ 371 (c)(1),
(2) Date: Sep. 28, 2018

(87) PCT Pub. No.: WO2017/166150
PCT Pub. Date: Oct. 5, 2017

(65) Prior Publication Data
US 2019/0124192 A1    Apr. 25, 2019

(51) Int. Cl.
*H04W 4/16* (2009.01)
*H04M 1/27485* (2020.01)
(Continued)

(52) U.S. Cl.
CPC ... *H04M 1/27485* (2020.01); *H04M 1/72572* (2013.01); *H04W 4/16* (2013.01); *H04W 8/183* (2013.01)

(58) Field of Classification Search
CPC .......... H04W 8/26; H04W 4/16; H04W 8/28; H04W 8/06; H04W 8/12; H04W 8/18;
(Continued)

(56) References Cited

U.S. PATENT DOCUMENTS 6,021,335 A * 2/2000 Zicker ..................... H04M 1/27
455/564
6,490,449 B1 * 12/2002 Thibert .................. H04Q 3/005
455/433

(Continued)

FOREIGN PATENT DOCUMENTS

CN    1402574 A    3/2003
CN    1665335 A    9/2005
(Continued)

*Primary Examiner* — Nimesh Patel
(74) *Attorney, Agent, or Firm* — Slater Matsil, LLP

(57) ABSTRACT

A call processing method and a mobile terminal are disclosed. The method includes, in one embodiment, querying whether a prestored contact database comprises contact information associated with the destination number in response to detecting a dial control instruction specific to a destination number currently obtained by a mobile terminal and in response to determining that the mobile terminal is in an international roaming state. In response to determining that the contact database comprises the contact information associated with the destination number, the method further determines, according to the contact information, an international roaming number used to call a target user corresponding to the destination number. A target user equipment of the target user is called according to the international roaming number.

15 Claims, 5 Drawing Sheets

(51) Int. Cl.
*H04M 1/725* (2006.01)
*H04W 8/18* (2009.01)

(58) Field of Classification Search
CPC ..... H04W 48/16; H04W 52/244; H04W 8/20; H04W 92/02; H04W 12/06; H04W 36/08; H04W 48/18; H04W 88/14; H04W 88/18; H04W 8/02; H04W 80/00; H04W 8/08; H04W 92/14; H04W 92/24; H04W 16/32; H04W 36/0022; H04W 60/00; H04W 88/16; H04W 8/04; H04W 36/14; H04W 8/10; H04W 8/183; H04W 40/00; H04W 76/10; H04W 40/20; H04W 84/042; H04W 4/023; H04W 4/02; H04W 40/24; H04W 84/12; H04W 16/18; H04W 40/26; H04W 68/12; H04W 92/20; H04W 4/18; H04W 52/0203; H04M 1/274566; H04M 3/54; H04M 2207/18; H04M 1/72572; H04M 2207/20; H04M 2215/32; H04M 3/42306; H04M 15/49; H04M 15/50; H04M 15/8033; H04M 2215/52; H04M 2215/70; H04M 2215/7435; H04M 3/2218; H04M 3/46; H04M 7/00; H04M 15/8038; H04M 7/1285; H04M 15/55; H04M 2215/2026; H04M 2215/2046; H04M 2215/34; H04M 2215/7442; H04M 2215/782; H04M 7/0057; H04M 7/006; H04M 7/1245; H04K 2203/16; H04K 2203/18; H04Q 3/0045; H04Q 3/005; H04Q 3/0029; H04Q 3/0087; H04Q 2213/13092; H04Q 2213/13149; H04Q 2213/13345; H04Q 2213/13349; H04Q 2213/13383; H04Q 3/0025; H04L 41/046; H04L 43/0811; H04L 65/1006; H04L 65/1016; H04L 12/6418; H04L 29/06027; H04L 2012/5626; H04L 47/20; H04L 69/22; H04L 65/1073; H04L 12/1407; H04L 12/1442; H04L 12/1475; H04L 45/00; H04L 12/12; H04L 45/44; H04L 45/48; H04L 69/32; H04L 45/04; H04L 51/38; H04L 65/1069; H04L 61/2007; H04L 69/08; H04L 69/18; H04L 29/12905; H04B 1/3833; H04B 1/69; H04B 7/15521; H04B 7/2615; H04B 1/38; H04B 7/18558; H01Q 1/241; H01Q 21/24; G06F 15/0225; G06F 11/30; G06F 2209/542; G06F 9/54

See application file for complete search history.

(56) References Cited

U.S. PATENT DOCUMENTS

| | | | |
|---|---|---|---|
| 6,941,159 B2 | 9/2005 | Tsai et al. | |
| 6,978,134 B1 * | 12/2005 | Palviainen | H04W 8/20 455/433 |
| 8,891,443 B2 * | 11/2014 | Hu | H04W 8/12 370/328 |
| 2004/0204118 A1 | 10/2004 | Tsai et al. | |
| 2006/0105790 A1 | 5/2006 | Jin et al. | |
| 2008/0194255 A1 * | 8/2008 | Walker | H04W 8/10 455/433 |
| 2009/0124291 A1 | 5/2009 | Cha | |
| 2011/0116613 A1 | 5/2011 | Ahlin | |
| 2012/0135721 A1 | 5/2012 | Gao | |
| 2015/0201055 A1 | 7/2015 | Li et al. | |
| 2015/0341783 A1 | 11/2015 | Yan | |

FOREIGN PATENT DOCUMENTS

| | | |
|---|---|---|
| CN | 1777207 A | 5/2006 |
| CN | 101340728 A | 1/2009 |
| CN | 101431739 A | 5/2009 |
| CN | 101640727 A | 2/2010 |
| CN | 103516916 A | 1/2014 |
| CN | 104539786 A | 4/2015 |
| CN | 104754548 A | 7/2015 |
| CN | 104780251 A | 7/2015 |
| EP | 2306691 A1 | 4/2011 |
| WO | 2009078626 A1 | 6/2009 |

\* cited by examiner

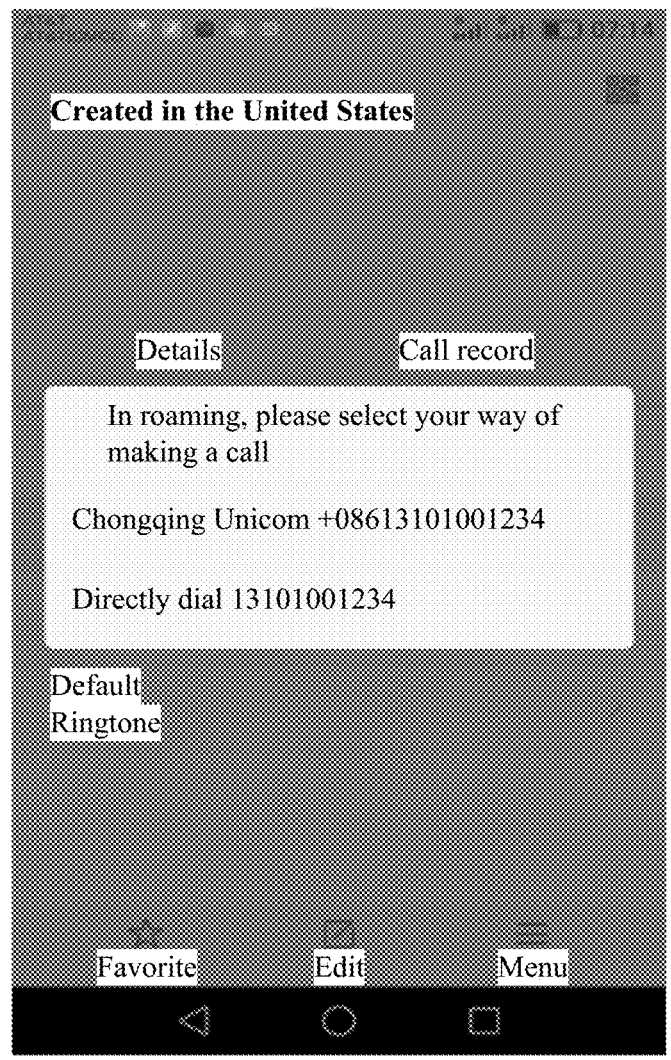
FIG. 2.1

CALL PROCESSING METHOD AND MOBILE TERMINAL

CROSS-REFERENCE TO RELATED APPLICATIONS

This application is a National Stage of International Application No. PCT/CN2016/077954, filed Mar. 31, 2016, which is hereby incorporated by reference in its entirety.

TECHNICAL FIELD

The present invention relates to the field of communications technologies, and in particular, to a call processing method and a mobile terminal.

BACKGROUND

Mobile terminals currently available on the market mainly use two dialing processing manners for an international roaming call. In a first manner, a user manually presets a default country code of a number stored in a contact list and enables automatic identification of dialing. In a second manner, a default country code of a number in a contact list is determined by using a subscriber identity module (Subscriber Identity Module, SIM) card of a mobile terminal.

During research, the inventor of this technical solution finds the following problems. In the foregoing first scheme, a mobile terminal can support only dialing processing for an international roaming call made by using the default country code. If a user dials a number whose home location is another country, the user needs to manually change the default country code or add a corresponding country code when editing the number. This is a complex operation and has low practicability. In the second scheme, when a user dials a phone number to make an international roaming call by using a mobile terminal in an international roaming state, the mobile terminal can add a corresponding country code only for a related number belonging to a country issuing the SIM card for the mobile terminal. For example, if the country issuing the SIM card for the mobile terminal is China, when the mobile terminal is in the international roaming state, the mobile terminal can add only a country code of China (that is, 86) before the phone number currently dialed by the user. If the currently dialed number is a German number, the mobile terminal cannot automatically add a country code of Germany (that is, 49) before the number because the country issuing the SIM card for the mobile terminal is China. Therefore, this scheme is applicable to only some numbers belonging to the country issuing the SIM card, and has many limitations during usage. As a result, it is difficult to meet an instant dialing requirement of a roaming user.

SUMMARY

This application provides a call processing method and a mobile terminal, so as to intelligently identify correct format information of a number to be dialed by a user and dial the number correctly. This helps improve convenience and a success rate of calling an international roaming user by using a mobile terminal.

According to a first aspect, an embodiment of the present invention provides a call processing method, including:

if a dial control instruction specific to a destination number currently obtained by a mobile terminal is detected and the mobile terminal is in an international roaming state, querying, by the mobile terminal, whether a prestored contact database includes contact information associated with the destination number;

if the contact database includes the contact information associated with the destination number, determining, by the mobile terminal according to the contact information, an international roaming number used to call a target user corresponding to the destination number; and calling, by the mobile terminal, the target user according to the international roaming number.

It can be learned that in the call processing method provided in this embodiment of the present invention, when the mobile terminal calls the roaming target user when being in the international roaming state, the mobile terminal may query the contact database according to the entered destination number; and when finding that the contact database includes the contact information associated with the destination number, determine, according to the contact information, the international roaming number used to call the target user corresponding to the destination number, so as to implement automatic dialing for a roaming call, without requiring a user to proactively add an international call prefix and a country code corresponding to the target user. This helps avoid a call failure caused by adding an incorrect international call prefix or country code, so as to improve convenience and a success rate of calling the international roaming user by using the mobile terminal.

With reference to the first aspect, in some possible implementations, the method further includes:

if the contact database does not include the contact information associated with the destination number, obtaining, by the mobile terminal, a call record that is prestored in the mobile terminal and that is associated with the destination number;

generating, by the mobile terminal, an international roaming number according to a home location identifier of the destination number and the destination number that are stored in the call record; and calling, by the mobile terminal, the target user according to the international roaming number.

It can be learned that in this embodiment of the present invention, when the destination number is a strange number, that is, a number for which no contact information is created, the mobile terminal may further query the prestored call record, and determine the international roaming number corresponding to the destination number according to valid information, in the call record, associated with a home location of the destination number. Therefore, a capability of the mobile terminal in identifying the international roaming number corresponding to the destination number is further improved, so as to help improve the convenience and success rate of calling the international roaming user by using the mobile terminal.

With reference to the first aspect, in some possible implementations, the contact information includes an additional information description field corresponding to the destination number, the additional information description field includes an original international roaming number of the target user, and the original international roaming number is generated when the mobile terminal detects, while creating the contact information, that a format of an original number used to call the target user complies with a number format of a country in which the mobile terminal is located; and the determining, by the mobile terminal according to the contact information, an international roaming number used to call a target user corresponding to the destination number includes:

determining, by the mobile terminal according to the original international roaming number, the international roaming number used to call the target user.

With reference to the first aspect, in some possible implementations, the determining, by the mobile terminal according to the original international roaming number, the international roaming number used to call the target user corresponding to the destination number includes:

if a country code in the original international roaming number matches a network currently accessed by the mobile terminal, determining, by the mobile terminal, that the destination number is the international roaming number used to call the target user;

if a country code in the original international roaming number does not match a network currently accessed by the mobile terminal and the original number is the same as the destination number, determining, by the mobile terminal, that the original international roaming number is the international roaming number used to call the target user; or if a country code in the original international roaming number does not match a network currently accessed by the mobile terminal and the original number is different from the destination number, generating, by the mobile terminal, a new international roaming number according to the country code and the destination number, and determining that the newly generated international roaming number is the international roaming number used to call the target user.

With reference to the first aspect, in some possible implementations, the contact information does not include an additional information description field corresponding to the destination number; and the determining, by the mobile terminal according to the contact information, an international roaming number used to call a target user corresponding to the destination number includes:

determining, by the mobile terminal, at least one reference home location identifier for the destination number;

if the at least one reference home location identifier includes a home location identifier that is the same as that of a subscriber identity module of the mobile terminal, generating, by the mobile terminal, a new international roaming number according to the destination number and the home location identifier that is determined to be the same as that of the subscriber identity module of the mobile terminal;

displaying, by the mobile terminal, the newly generated international roaming number and the destination number in a number selection interface of the mobile terminal; and determining, by the mobile terminal, that a selected number in the number selection interface is the international roaming number of the target user.

With reference to the first aspect, in some possible implementations, the contact information does not include an additional information description field corresponding to the destination number; and the determining, according to the contact information, an international roaming number used to call a target user corresponding to the destination number includes:

determining at least one reference home location identifier for the destination number;

generating at least one new international roaming number according to the at least one reference home location identifier and the destination number;

displaying the newly generated international roaming number and the destination number in a number selection interface of the mobile terminal; and determining that a selected number in the number selection interface is the international roaming number of the target user.

Further, the mobile terminal may further display, in the number selection interface, descriptive information corresponding to each number. For example, the descriptive information may be an abbreviation of a country code, an area description information of a home location, or the like that is corresponding to the number.

It can be learned that the mobile terminal provided in this embodiment of the present invention identifies reference home location identifiers as many as possible for the destination number, and provides a user with an international roaming number corresponding to the destination number and each of the reference home location identifiers. In this case, the user selects a desired number, and therefore a call setup success rate can be increased.

According to a second aspect, an embodiment of the present invention provides a mobile terminal, where the mobile terminal includes a function module, and the function module is configured to perform some or all of steps described in any method in the first aspect of embodiments of the present invention.

According to a third aspect, an embodiment of the present invention provides a mobile terminal, including:

a memory, a processor, a communications interface, and a communications bus, where the memory, the processor, and the communications interface are connected by using the communications bus and implement mutual communication, and the communications interface is configured to perform wireless communication; and the processor invokes the executable program code stored in the memory, and performs some or all of steps described in any method in the first aspect of the embodiments of the present invention.

According to a fourth aspect, an embodiment of the present invention provides a computer readable storage medium, where the computer readable storage medium stores program code to be executed by a mobile terminal. The program code specifically includes an execution instruction, and the execution instruction is used to perform some or all of steps described in any method in the first aspect of the embodiments of the present invention.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 2.1 shows an example of a number selection interface providing a user with multiple optional international roaming numbers according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding of the embodiments of the present invention, the following briefly describes some identification information used in a mobile communications network.

A country code, also referred to as a country code, is used to identify a country. For example, a country code of China is 86, a country code of Cambodia is 855, and a country code of India is 91.

An international call prefix, also referred to as an international prefix, is a number added before a country code of a target user when a call is made from one country to another. For example, 00 is added before a country code of a target user when a call is made from China, and 001 is added before a country code of a target user when a call is made from Cambodia.

A mobile country code (MCC), including three digits, is also used to identify a country. One country may be assigned multiple MCCs. For example, the United States has MCCs of 310, 311, and 316, but China has only one MCC: 460.

A mobile network code (MNC) includes two to three digits, and is used in combination with an MCC to uniquely identify a mobile network operator. For example, an MNC of China Mobile is 00, an MNC of 800 MHz band Code Division Multiple Access CDMA2000 of China Unicom is 03, and an MNC of a Globalstar network of China Satellite is 04.

A mobile terminal in the embodiments of the present invention may be a mobile phone, a tablet computer, a wearable device, a personal digital assistant (PDA for short), a mobile point of sales (POS for short), an in-vehicle computer, or another mobile terminal device with a mobile communication function. This is not specifically limited in the embodiments of the present invention.

Figure 1:
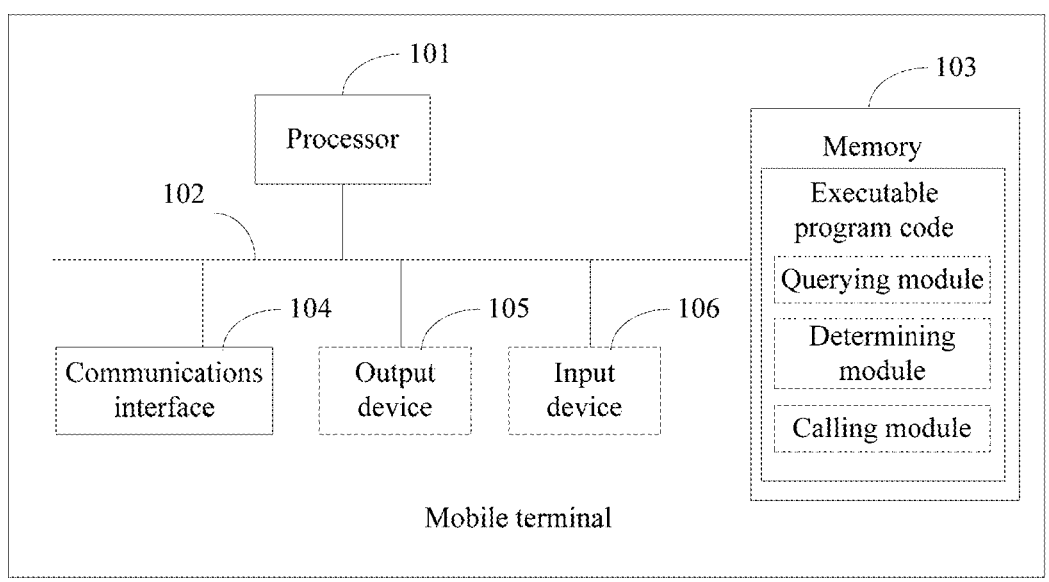
FIG. 1 is a schematic structural diagram of a mobile terminal configured to implement a call processing method according to an embodiment of the present invention.

Referring to FIG. 1, FIG. 1 is a schematic structural diagram of a mobile terminal configured to support a call processing method according to an embodiment of the present invention. The mobile terminal includes at least one processor 101, a communications bus 102, a memory 103, and at least one communications interface 104. The processor 101 may be a central processing unit CPU, a microprocessor, an application-specific integrated circuit (ASIC), or one or more integrated circuits configured to control execution of the technical solution. The communications bus 102 may include a channel through which information is transferred between the foregoing components. The memory 103 may be a read-only memory (ROM) or another type of static storage device that may store static information and instructions, a random access memory (RAM) or another type of dynamic storage device that may store information and instructions, an electrically erasable programmable read-only memory (EEPROM), a compact disc read-only memory (CD-ROM) or another optical disc storage, an optical disc storage (including a compact disc, a laser disc, an optical disc, a digital versatile disc, a Blu-ray disc, or the like), a magnetic disc storage medium or another magnetic storage device, or any other medium that can be used to carry or store expected program code in a structural form of an instruction or data and that can be accessed by a computer, but no limitation is set thereto. The communications interface 104 may be configured to receive and send information, or receive and send a signal during a call. In particular, after receiving downlink information from a base station, the communications interface 104 sends the downlink information to the processor 101 for processing. In addition, the communications interface 104 sends designed uplink data to the base station. Generally, the communications interface 104 may include but is not limited to an antenna, at least one amplifier, a transceiver, a coupler, an LNA (low noise amplifier), a duplexer, and the like. In addition, the communications interface 104 may further communicate with a network and other devices by means of radio communications. For the radio communications, any communications standard or protocol may be used, including but not limited to GSM (Global System for Mobile Communications), GPRS (General Packet Radio Service), CDMA (Code Division Multiple Access), WCDMA (Wideband Code Division Multiple Access), LTE (Long Term Evolution). Further, the mobile terminal may further include an output device 105 and an input device 106. The output device 105 communicates with the processor 101, and may display information in multiple manners. The input device 106 communicates with the processor 101, and may accept an input from a user in multiple manners. In a specific implementation, the foregoing mobile terminal may be, for example, various types of communications device with a wireless function, such as a mobile phone, a tablet computer, and a personal digital assistant (PDA). A specific structure type of the mobile terminal is not limited in the embodiments of the present invention.

The memory 103 prestores executable program code, and the memory 103 further stores a kernel module, where the kernel module includes an operating system (for example, WINDOWS™, ANDROID™, and IOS™). The processor 101 of the foregoing mobile terminal can be coupled with the at least one memory 103, and can invoke the executable program code in the at least one memory 103 to perform call processing methods, shown in FIG. 2A, FIG. 2B, and FIG. 3, disclosed in the embodiments of the present invention. The following describes in detail the call processing method provided in the embodiments of the present invention.

Figure 2A:
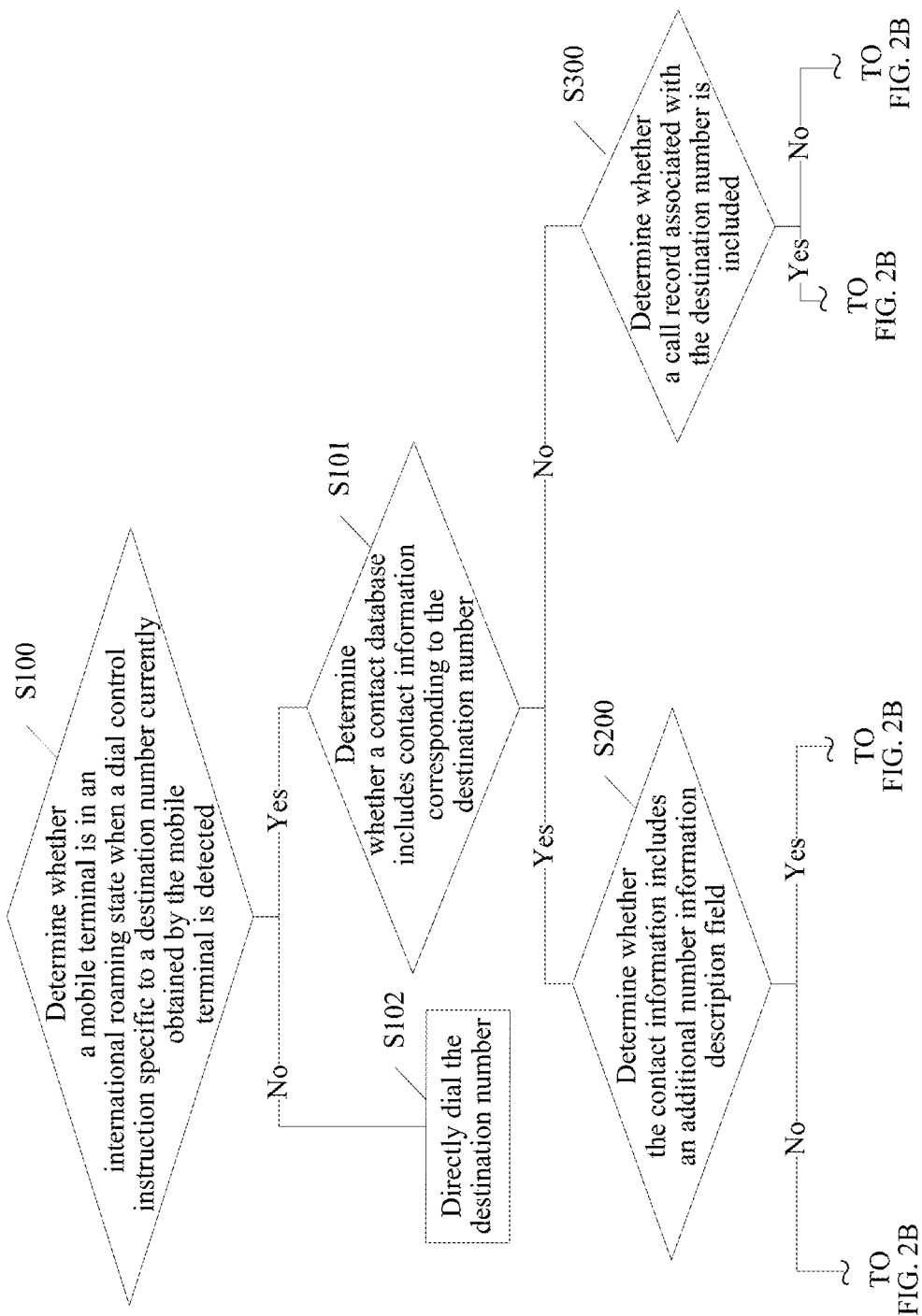
FIG. 2A and FIG. 2B are a schematic flowchart of a call processing method according to an embodiment of the present invention.
Figure 2B:
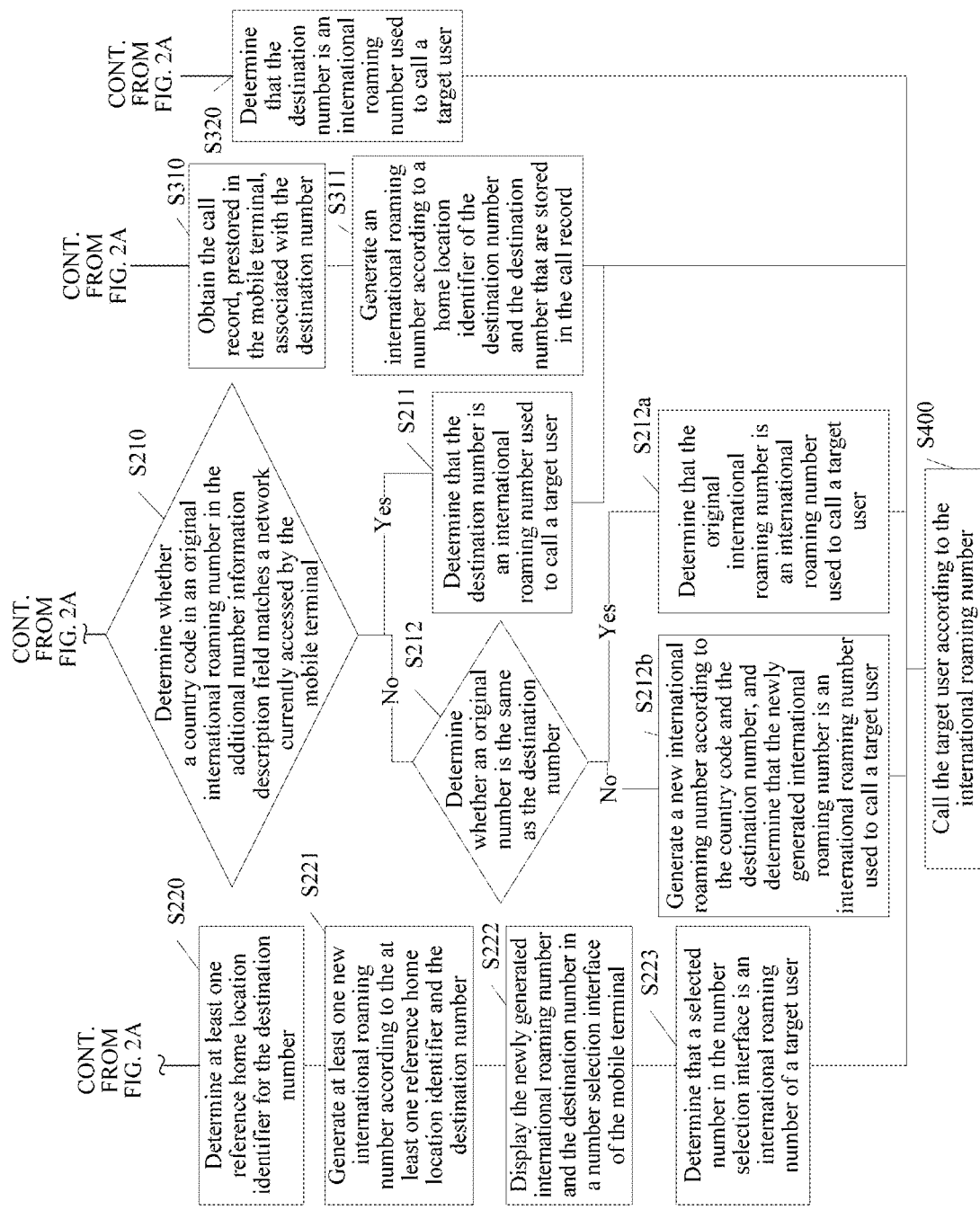

Referring to FIG. 2A and FIG. 2B, FIG. 2A and FIG. 2B show a call processing method disclosed by an embodiment of the present invention. The method includes the following steps.

S100: If a user enters a destination number and taps a call button to start calling a target user corresponding to the destination number (that is, a mobile terminal has detected a dial control instruction specific to the destination number currently obtained by the mobile terminal), the mobile terminal determines whether the mobile terminal is in an international roaming state.

If the mobile terminal is in the international roaming state, step S101 is performed; or if the mobile terminal is not in the international roaming state, step S102 is performed.

S102: The mobile terminal directly dials the destination number, that is, calls, according to the destination number, the target user corresponding to the destination number.

The destination number currently obtained by the mobile terminal may be an original mobile number or a fixed-line phone number of the target user entered by the user, for example, an 11-digit mobile number or a 12-digit fixed-line phone number. Alternatively, a prestored contact database may be queried according to contact identification information entered by the user. For example, a contact name is entered, and a prestored corresponding destination number is found by using the contact name.

That the mobile terminal is in an international roaming state means that a subscriber identity module SIM card currently running on the mobile terminal is located in a country other than a country issuing the SIM card. Specifically, whether the mobile terminal is in an international roaming state can be determined by comparing a mobile country code of the SIM card in the mobile terminal with a mobile network code of a network currently accessed by the mobile terminal. For example, a mobile country code of a SIM card issued in China is 460 or +, mobile country codes of SIM cards issued in the United States are 310, 311, and 316; and mobile network codes of China Mobile, China Unicom, and China Telecom are 00, 01, and 02, respectively, and a mobile network code of a Cingular (AT&T Wireless) network of the United States is 38. If a mobile country code of a SIM card of a user's mobile phone is 460 and a network currently accessed by the user's mobile phone is a Cingular network, corresponding to the mobile network code of 38, of the United States, it is apparent that the mobile country code 460 does not match the mobile network code 38, the user's mobile phone is currently in the international roaming state.

S101: The mobile terminal queries whether a prestored contact database includes contact information associated with the destination number.

If the prestored contact database includes the contact information associated with the destination number, step S200 is performed; or if the prestored contact database does not include the contact information associated with the destination number, step S300 is performed.

The contact information includes a target user identifier (for example, a contact name), a contact information creation location, and an original number of the target user.

In addition, the contact information further includes an additional information description field corresponding to the destination number. The additional information description field includes an original international roaming number of the target user. The original international roaming number is generated when the mobile terminal detects, while creating the contact information, that a format of an original number used to call the target user complies with a number format of a country in which the mobile terminal is located. For example, the additional information description field may be a "normalized" field in a contact database of a mobile phone with an Android operating system, and an international roaming number to which a corresponding international call prefix and country code are added is stored in this field.

In addition, a time when the mobile terminal creates contact information corresponding to an original number in the contact database may be flexibly set as required. For example, the contact information may be created in real time according to a user's creation instruction, or the mobile terminal generates the contact information corresponding to the original number every time the mobile terminal generates a call record of valid duration corresponding to the original number when the contact information corresponding to the original number is not stored in the contact database of the mobile terminal. This is not uniquely limited in this embodiment of the present invention.

For example, when a user's mobile phone records a call record of valid duration corresponding to an original number 13776507888 and a contact database does not store contact information corresponding to this number, the mobile terminal may create the contact information corresponding to this number in a backend after generating the call record corresponding to the original number 13776507888. The contact information may specifically include identity information of a target user corresponding to the original number identified by voice, home location information of a target user, and other additional information. Further, optionally, if the user's mobile phone determines that a number format of the current original number 13776507888 matches an 11-digit mobile number format of China issuing a SIM card for the user's mobile phone, the user's mobile phone may call an interface of an Android Android operating system for generating an additional number information description field, generate, by using this interface, the additional number information description field, that is, the "normalized" field, corresponding to the original number, and store, in the field, an international roaming number 4608613776507888 and/or +8613776507888 corresponding to the original number 13776507888.

S200: The mobile terminal determines whether the contact information associated with the destination number includes an additional number information description field.

If the contact information associated with the destination number includes the additional number information description field, step S210 is performed; or if the contact information associated with the destination number does not include the additional number information description field, steps S220, S221, S222, S223, and S400 are performed.

S210: The mobile terminal determines whether a country code in an original international roaming number in the additional information description field matches a network currently accessed by the mobile terminal.

If the country code in the original international roaming number in the additional information description field matches the network currently accessed by the mobile terminal, steps S211 and S400 are performed; or if the country code in the original international roaming number in the additional information description field does not match the network currently accessed by the mobile terminal, step S212 is performed.

S211: The mobile terminal determines that the destination number is an international roaming number used to call the target user.

For example, a user's mobile phone is provided with a subscriber identity module SIM card issued by China, and the user's mobile phone accesses a network whose mobile country code is 262 (corresponding to a mobile country code of Germany) and creates contact information A corresponding to a German original number 52028569770 in the network of Germany. The contact information A includes a contact name John, a creation location Germany, and the entered original number 52028569770. When the user's mobile phone identifies that a format of the number 52028569770 complies with a fixed-line phone number format of Germany, the user's mobile phone obtains an international call prefix 00 and a country code 49 of Germany, generates an original international roaming number 004952028569770 corresponding to the German original number, and creates a "normalized" field including the generated original international roaming number 004952028569770. Then, if the user enters the phone number 52028569770 in the mobile phone within a territory of Germany, the user's mobile phone determines that the country code 49 in the original international roaming number matches the Germany's telecom network currently accessed by the user's mobile phone. In this case, the user's mobile phone determines that the entered phone number 52028569770 is the international roaming number used to call John.

S212: The mobile terminal determines whether an original number in the original international roaming number is the same as the destination number.

If the original number in the original international roaming number is the same as the destination number, steps S212a and S400 are performed; or if the original number in the original international roaming number is different from the destination number, steps S212b and S400 are performed.

The original number in the original international roaming number refers to a number of the target user correspondingly stored by the mobile terminal when the mobile terminal creates the contact information, and the original international roaming number is generated according to the original number and a corresponding international call prefix and country code. When the user updates the original number in the contact information subsequently, if the mobile terminal detects that a format of an updated original number is the same as a number format of a country in which the mobile terminal is located, the mobile terminal synchronously updates the original international roaming number in the additional number information description field. If the mobile terminal detects that the format of the updated original number is different from the number format of the country in which the mobile terminal is located, the mobile terminal does not update the original international roaming number in the additional number information description field.

S212a: The mobile terminal determines that the original international roaming number is an international roaming number used to call the target user.

For example, a mobile phone is provided with a subscriber identity module SIM card issued by China and is used to create contact information corresponding to a Chinese number 13776507924 in a China Mobile network. The contact information includes a contact name Wang, a creation location China (CN for short), and the entered original number 13776507924. When the user's mobile phone identifies that a format of the number 13776507924 matches a mobile number format of China in which the user's mobile phone is currently located, the user's mobile phone obtains an international call prefix 00 and a country code 86 of China, generates an original international roaming number 008613776507924 corresponding to the mobile number, and creates a "normalized" field including the generated original international roaming number 008613776507924. Then, if the user enters the destination number 13776507924 in the mobile phone in the United States, the user's mobile phone determines that the country code 86 in the original international roaming number does not match a network, currently accessed by the user's mobile phone, of the United States and the original number 13776507924 in the contact information is the same as the destination number 13776507924 entered by the user this time. In this case, the user's mobile phone determines that the original international roaming number 008613776507924 in the "normalized" field is an international roaming number used to call Wang.

S212b: The mobile terminal generates a new international roaming number according to the country code and the destination number, and determines that the newly generated international roaming number is an international roaming number used to call the target user.

For example, a mobile phone is provided with a subscriber identity module SIM card issued by China and is used to create contact information corresponding to a Chinese number 13776507924 in a China Mobile network. The contact information includes a contact name Wang, a creation location China (CN for short), and the original number 13776507924. When the user's mobile phone identifies that a format of the number 13776507924 matches a mobile number format of China in which the user's mobile phone is currently located, the user's mobile phone obtains an international call prefix 00 and a country code 86 of China, generates an original international roaming number 008613776507924 corresponding to the mobile number, and creates a "normalized" field including the generated original international roaming number 008613776507924. Then, the user travels to the United States on business and is informed that the mobile number of Wang is changed to 13776507925. Therefore, the user updates the original number in the contact information of Wang from 13776507924 to 13776507925. When the user's mobile phone identifies that a format of the number 13776507925 does not comply with a mobile number format (a mobile number of the United States has 10 digits) of the United States in which the user's mobile phone is currently located and therefore does not synchronously update the original international roaming number 008613776507924 in the "normalized" field. Then, if the user enters the destination number 13776507925 (certainly, the contact name may be entered, and then the contact name is associated with the updated original number 13776507925) in the mobile phone in the United States, the user's mobile phone determines that the country code 86 in the original international roaming number does not match a telecommunication network, of the United States, currently accessed by the user's mobile phone and the original number 13776507925 in the contact information is different from the destination number 13776507924 entered by the user this time. Therefore, the user's mobile phone generates a new international roaming number 008613776507925 according to the international call prefix 00, the country code 86, and the destination number 13776507925, and determines that the newly generated international roaming number 008613776507925 is an international roaming number used to call Wang.

S220: The mobile terminal determines at least one reference home location identifier for the destination number.

The reference home location identifier includes a country code. A specific implementation of the determining, by the mobile terminal, at least one reference home location identifier for the destination number may be: the mobile terminal determines a number format of the destination number, queries, by using the number format as a query identifier, a prestored country code list that includes a mapping relationship between number formats and country codes, and obtains at least one country code corresponding to the number format of the destination number.

For example, a mobile phone is provided with a subscriber identity module SIM card issued by China, and a user creates contact information of a 10-digit mobile number on a network of China by using the mobile phone. Because a format of the mobile number does not comply with a mobile number format of China, an additional information description field is not generated in the contact information currently. Then, the user uses the mobile phone in the United States to dial the 10-digit mobile number. The mobile phone determines that the mobile phone itself is in an international roaming state and the corresponding contact information does not include the additional number information description field, determines that a number format of the 10-digit mobile number is that a mobile number has 10 digits, queries a prestored country code list by using a query identifier "10-digit mobile number", and determines that reference home location identifiers corresponding to "10-digit mobile number" include a country code 1 of the United States, a country code 82 of South Korea/North Korea, and a country code 81 of Japan.

Further, optionally, the mobile terminal may further display, in the number selection interface, descriptive information corresponding to each number. For example, the descriptive information may be an abbreviation of a country code, area description information of a home location, or the like that is corresponding to the number.

S221: The mobile terminal generates at least one new international roaming number according to the at least one reference home location identifier and the destination number.

S222: The mobile terminal displays the newly generated international roaming number and the destination number in a number selection interface of the mobile terminal.

S223: The mobile terminal determines that a selected number in the number selection interface is an international roaming number of the target user.

For example, a mobile phone is provided with a subscriber identity module SIM card issued by China and is used to create contact information corresponding to a Chinese number 13101001234 on a network of the United States. The contact information includes a contact name Li, a creation location the United States, and the original number 13101001234. The user's mobile phone identifies that a format of the number 13101001234 does not comply with a mobile number format of the United States in which the user's mobile phone is currently located, and therefore does not generate a "normalized" field. Then, the user uses the mobile phone in the United States to call a target user whose destination number is 13101001234, and when detecting that there is no corresponding "normalized" field in the associated contact information of Li, the user's mobile phone determines that a reference home location identifier of the destination number 13101001234 is a country code 86 of China. Further, the user's mobile phone detects that a home location identifier 1 is the same as a home location identifier of the Chinese SIM card in the user's mobile phone. The user's mobile phone obtains an international call prefix 00 (corresponding to + used during dialing on a mobile phone) and a country code 86 of China and generates a new international roaming number +8613101001234. Next, as shown in FIG. 2.1, the user's mobile phone displays the newly generated international roaming number +8613101001234 (or may additionally display information such as an area to which the displayed number belongs and a mobile network type, for example, Chongqing Unicom +8613101001234) and the destination number 13101001234 in a number selection interface. Finally, the user's mobile phone determines that a selected number is an international roaming number of the target user.

S300: The mobile terminal determines whether a call record associated with the destination number is included.

If the call record associated with the destination number is included, steps S310, S311, and S400 are performed; or if the call record associated with the destination number is not included, steps S320 and S400 are performed.

S310: The mobile terminal obtains the call record that is prestored in the mobile terminal and that is associated with the destination number.

S311: The mobile terminal generates an international roaming number according to a home location identifier of the destination number and the destination number that are stored in the call record.

For example, the home location identifier may be an abbreviation of a country code countryISO, or a country code.

S320: The mobile terminal determines that the destination number is an international roaming number used to call the target user.

S400: The mobile terminal calls the target user according to the international roaming number.

In a specific implementation, the mobile terminal may communicate with another device or a communications network by using a processor 101 and a transmitter, so as to call the target user according to the international roaming number.

It can be learned, from any optional embodiment corresponding to the foregoing process of steps S100->S101->S200->S210->S211->S400, process of steps S100->S101->S200->S210->S212->S212a->S400, or process of steps S100->S101->S200->S210->S212->S212b->S400, that: when the mobile terminal calls the roaming target user when being in the international roaming state, the mobile terminal may query the contact database according to the entered destination number; and when finding that the contact database includes the contact information associated with the destination number, determine, according to the contact information, the international roaming number used to call the target user corresponding to the destination number, so as to implement automatic dialing for a roaming call, without requiring the user to proactively add an international call prefix and a country code corresponding to the target user. This helps avoid a call failure caused by adding an incorrect international call prefix or country code, so as to improve convenience and a success rate of calling the international roaming user by using the mobile terminal.

It can be learned, from any optional embodiment corresponding to the foregoing process of steps S100->S101->S300->S310->S311->S400 or process of steps S100->S101->S300->S320->S400, that: when the destination number is a strange number, that is, a number for which no contact information is created, the mobile terminal may further query the prestored call record, and determine the international roaming number corresponding to the destination number according to valid information, in the call record, associated with a home location of the destination number. Therefore, a capability of the mobile terminal in identifying the international roaming number corresponding to the destination number is further improved, so as to help improve the convenience and success rate of calling the international roaming user by using the mobile terminal.

In addition, it should be noted that the call record is preferentially a call record of valid duration, for example, a call record whose duration is longer than 10 seconds.

It can be learned from an optional embodiment corresponding to the foregoing process of steps S100->S101->S200->S220->S221->S222->S223->S400 that: the mobile terminal identifies reference home location identifiers as many as possible for the destination number, and provides a user with an international roaming number corresponding to the destination number and each of the reference home location identifiers. In this case, the user selects a desired number, and therefore a call setup success rate can be increased.

It can be learned from an optional embodiment corresponding to the foregoing process of steps S100->S101->S300->S320->S400 that: when the contact database does not include the contact information associated with the destination number and the call record prestored in the mobile terminal does not include the call record associated with the destination number, the mobile terminal determines that the destination number is the international roaming number used to call the target user. This case is equivalent to directly dialing the destination number currently entered by the user, so that a call requirement of the user can be met as accurately as possible and user experience is improved.

Optionally, in an embodiment of the present invention, when determining that the contact information does not include the additional number information description field, the mobile terminal may further perform the following operations. The mobile terminal may determine, at least one reference home location identifier for the destination number, where the reference home location identifier includes a country code. If the at least one reference home location identifier includes a home location identifier that is the same as that of a subscriber identity module SIM card of the mobile terminal, generating, by the mobile terminal, a new international roaming number according to the destination number and the home location identifier that is determined to be the same as that of the subscriber identity module of the mobile terminal. The mobile terminal may display, the newly generated international roaming number and the destination number in a number selection interface of the mobile terminal. The mobile terminal may determine, that a selected number in the number selection interface is the international roaming number of the target user.

It can be learned that in this optional embodiment, the mobile terminal may first select, by comparing the reference home location identifier with the home location identifier of the SIM card, some more possible home location identifiers corresponding to a home location of the target user, and then generate a corresponding international roaming number. In this way, number selection efficiency of the mobile terminal can be improved, and user experience is improved to some extent.

Figure 3:
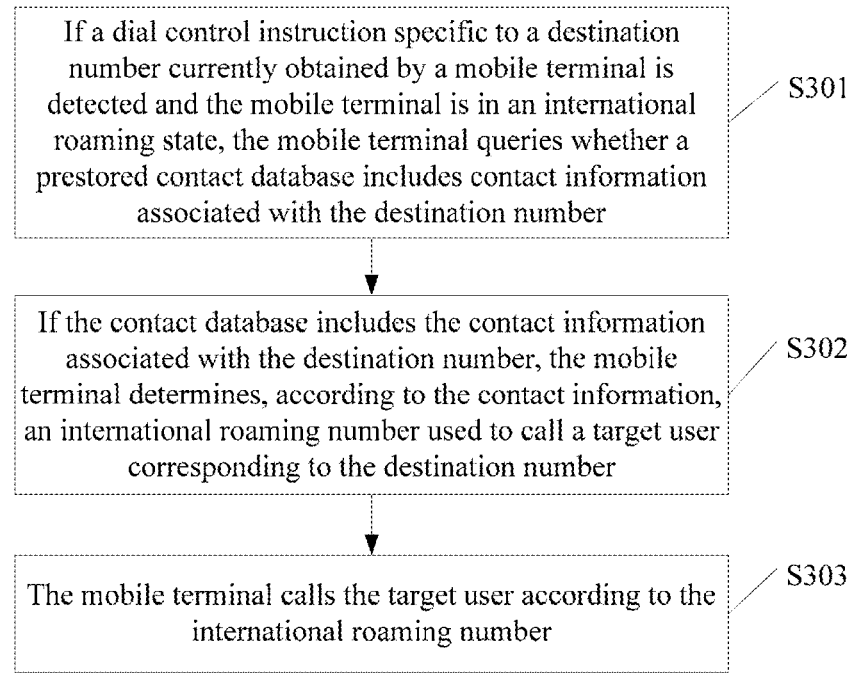
FIG. 3 is a schematic flowchart of another call processing method according to an embodiment of the present invention.

Referring to FIG. 3, FIG. 3 is a schematic flowchart of another call processing method according to an embodiment of the present invention. As shown in FIG. 3, the call processing method includes the following steps.

S301: If a dial control instruction specific to a destination number currently obtained by a mobile terminal is detected and the mobile terminal is in an international roaming state, the mobile terminal queries whether a prestored contact database includes contact information associated with the destination number.

Step S301 is corresponding to the foregoing process of steps S100->S101.

S302: If the contact database includes the contact information associated with the destination number, the mobile terminal determines, according to the contact information, an international roaming number used to call a target user corresponding to the destination number.

In a specific implementation, if the contact information includes an additional information description field corresponding to the destination number, the additional information description field includes an original international roaming number of the target user, and the original international roaming number is generated when the mobile terminal detects, while creating the contact information, that a format of an original number used to call the target user complies with a number format of a country in which the mobile terminal is located. A specific implementation of the determining, by the mobile terminal according to the contact information, an international roaming number used to call a target user corresponding to the destination number is: determining, according to the original international roaming number, the international roaming number used to call the target user.

For example, an implementation of the determining, according to the original international roaming number, the international roaming number used to call the target user may be any one of the foregoing process of steps S200->S210->S211, process of steps S200->S210->S212->S212a, or process of steps S200->S210->S212->S212b.

S303: The mobile terminal calls the target user according to the international roaming number.

It can be learned that in the call processing method provided in this embodiment of the present invention, when the mobile terminal calls the roaming target user when being in the international roaming state, the mobile terminal may query the contact database according to the entered destination number; and when finding that the contact database includes the contact information associated with the destination number, determine, according to the contact information, the international roaming number used to call the target user corresponding to the destination number, so as to implement automatic dialing for a roaming call, without requiring a user to proactively add an international call prefix and a country code corresponding to the target user. This helps avoid a call failure caused by adding an incorrect international call prefix or country code, so as to improve convenience and a success rate of calling the international roaming user by using the mobile terminal.

Figure 4:
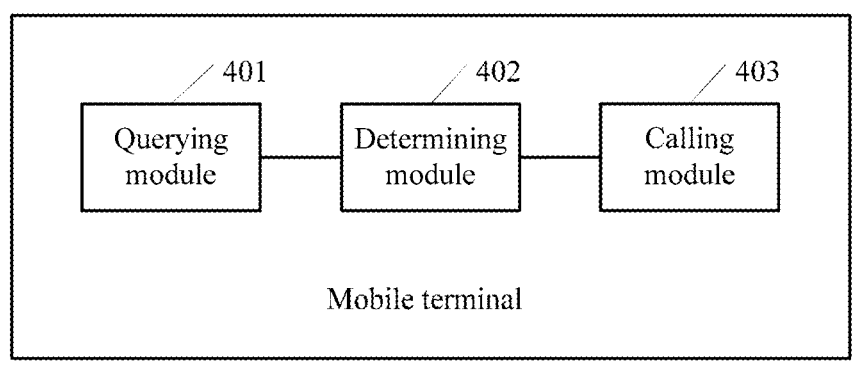
FIG. 4 is a composition block diagram of a mobile terminal according to an embodiment of the present invention.

The following provides an apparatus embodiment of the present invention. Referring to FIG. 4, FIG. 4 is a composition block diagram of a mobile terminal according to an apparatus embodiment of the present invention. As shown in FIG. 4, the mobile terminal includes a querying module 401, a determining module 402, and a calling module 403.

The querying module 401 is configured to: if a dial control instruction specific to a destination number currently obtained by a mobile terminal is detected and the mobile terminal is in an international roaming state, query whether a prestored contact database includes contact information associated with the destination number.

The determining module 402 is configured to: if the contact database includes the contact information associated with the destination number, determine, according to the contact information, an international roaming number used to call a target user corresponding to the destination number.

The calling module 403 is configured to call the target user according to the international roaming number.

Optionally, the mobile terminal further includes: an obtaining module, configured to: if the contact database does not include the contact information associated with the destination number, obtain a call record that is prestored in the mobile terminal and that is associated with the destination number; a generating module, configured to generate an international roaming number according to a home location identifier of the destination number and the destination number that are stored in the call record; and a second calling module, configured to call the target user according to the international roaming number.

Optionally, the contact information includes an additional information description field corresponding to the destination number. The additional information description field includes an original international roaming number of the target user. The original international roaming number is generated when the mobile terminal detects, while creating the contact information, that a format of an original number used to call the target user complies with a number format of a country in which the mobile terminal is located. The determining module 402 is specifically configured to: determine, according to the original international roaming number, the international roaming number used to call the target user.

Optionally, a specific implementation of the determining, by the determining module 402 according to the original international roaming number, the international roaming number used to call the target user is: if a country code in the original international roaming number matches a network currently accessed by the mobile terminal, determining that the destination number is the international roaming number used to call the target user; if a country code in the original international roaming number does not match a network currently accessed by the mobile terminal and the original number is the same as the destination number, determining that the original international roaming number is the international roaming number used to call the target user; or if a country code in the original international roaming number does not match a network currently accessed by the mobile terminal and the original number is different from the destination number, generating a new international roaming number according to the country code and the destination number, and determining that the newly generated international roaming number is the international roaming number used to call the target user.

Optionally, the contact information does not include an additional information description field corresponding to the destination number. The determining module 402 is specifically configured to: determine at least one reference home location identifier for the destination number; generate at least one new international roaming number according to the at least one reference home location identifier and the destination number; display the newly generated international roaming number and the destination number in a number selection interface of the mobile terminal; and determine that a selected number in the number selection interface is the international roaming number of the target user.

It should be noted that the mobile terminal described in the apparatus embodiment of the present invention is presented in a form of a function module. The term "module" herein should have a meaning interpreted to the largest extent possible. For example, an object configured to implement a function described by each "module" may be an integrated circuit ASIC, a single circuit, a processor (shared, dedicated, or a chip set) and a memory configured to execute one or more software or firmware programs, a combinational logic circuit, and/or another appropriate component that provides the foregoing function.

For example, a person skilled in the art may know that a composition form of a hardware carrier of the mobile terminal may specifically be the mobile terminal shown in FIG. 1. Executable program code stored in a memory of the mobile terminal may specifically include a querying module, a determining module, and a calling module.

A function of the querying module 401 may be implemented by a processor 101 and a memory 103 of the mobile terminal. Specifically, the processor 101 runs the querying module in the memory 103 to query whether a prestored contact database includes contact information associated with the destination number.

A function of the determining module 402 may be implemented by the processor 101 and the memory 103 of the mobile terminal. Specifically, the processor 101 runs the determining module in the memory 103 to determine, according to the contact information, an international roaming number of a target user corresponding to the destination number.

A function of the calling module 403 may be implemented by the processor 101 and the memory 103 of the mobile terminal. Specifically, the processor 101 runs the calling module 403 in the memory 103 to call the target user according to the international roaming number.

It can be learned that when the mobile terminal provided in this embodiment of the present invention calls the roaming target user when being in the international roaming state, the mobile terminal may query the contact database according to the entered destination number; and when finding that the contact database includes the contact information associated with the destination number, determine, according to the contact information, the international roaming number used to call the target user corresponding to the destination number, so as to implement automatic dialing for a roaming call, without requiring a user to proactively add an international call prefix and a country code corresponding to the target user. This helps avoid a call failure caused by adding an incorrect international call prefix or country code, so as to improve convenience and a success rate of calling the international roaming user by using the mobile terminal.

An embodiment of the present invention further provides a computer storage medium, where the computer storage medium may store a program. During program execution, some or all of steps in any call processing method recorded in the foregoing method embodiments are performed.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable memory. Based on such an understanding, the technical solutions of the present invention essentially, or the part contributing to the prior art, or all or some of the technical solutions may be implemented in the form of a software product. The software product is stored in a storage and includes several instructions for instructing a mobile terminal (which may be a personal computer, a server, or a network device) to perform all or some of the steps of the methods described in the embodiments of the present invention. The foregoing storage includes: any medium that can store program code, such as a USB flash drive, a read-only memory (ROM), a random access memory (RAM), a removable hard disk, a magnetic disk, or an optical disc.

Persons of ordinary skill in the art may understand that all or some of the steps of the methods in the embodiments may be implemented by a program instructing relevant hardware. The program may be stored in a computer readable storage. The storage may include a flash memory, a read-only memory (ROM for short), a random access memory (RAM for short), a magnetic disk, and an optical disc.

The embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A call processing method comprising:
   in response to detecting a dial control instruction specific to a destination number currently obtained by a mobile terminal and in response to determining that the mobile terminal is in an international roaming state, querying whether a prestored contact database comprises contact information associated with the destination number, wherein the contact information comprises a contact identifier, a country in which the contact information was created, and a contact number, stored in association with each other in the prestored contact database;
   in response to determining that the prestored contact database comprises the contact information associated with the destination number, determining whether the contact information associated with the destination number includes an additional information description field;
   in response to determining that the prestored contact database comprises contact information associated with the destination number, and the contact information associated with the destination number does not include the additional information description field, determining a number format of the destination number, comparing the number format of the destination number with a number format of a country in which the mobile terminal is located, obtaining a country code in response to the comparing the number format of the destination number with the number format of the country in which the mobile terminal is located, generating a first international roaming number according to the country code and the destination number, and calling a target equipment of a target user according to the first international roaming number; and
   in response to determining that the prestored contact database comprises the contact information associated with the destination number, and the contact information associated with the destination number includes the additional information description field, determining, according to the contact information, a second international roaming number used to call a target user corresponding to the destination number, the second international roaming number including the country code, and calling the target equipment of the target user according to the second international roaming number.

2. The method according to claim 1, wherein the method further comprises:
   in response to determining that the prestored contact database does not comprise the contact information associated with the destination number, obtaining a call record that is prestored in the mobile terminal and that is associated with the destination number; and
   before calling the target equipment, generating a third international roaming number according to a home location identifier of the destination number and the destination number that are stored in the call record.

3. The method according to claim 1, wherein the contact information associated with the destination number comprises the additional information description field corresponding to the destination number, the additional information description field comprises an original international roaming number of the target user, and the original international roaming number was generated when the mobile terminal detected, while creating the contact information, that a format of an original number used to call the target user complied with the number format of the country in which the mobile terminal was located while the contact information was created; and
   wherein the determining, according to the contact information, the second international roaming number used to call the target user corresponding to the destination number comprises:
   determining, according to the original international roaming number, the second international roaming number used to call the target user.

4. The method according to claim 3, wherein determining the second international roaming number comprises:
   in response to determining that a country code in the original international roaming number matches a network currently accessed by the mobile terminal, determining that the destination number is the second international roaming number used to call the target user; and
   in response to determining that a country code in the original international roaming number does not match a network currently accessed by the mobile terminal and the original number is the same as the destination number, determining that the original international roaming number is the second international roaming number used to call the target user.

5. The method according to claim 3, wherein determining the second international roaming number comprises:

in response to determining that a country code in the original international roaming number matches a network currently accessed by the mobile terminal, determining that the destination number is the second international roaming number used to call the target user; and in response to determining that a country code in the original international roaming number does not match a network currently accessed by the mobile terminal and the original number is different from the destination number, generating a new international roaming number according to the country code and the destination number, and determining that the generated new international roaming number is the second international roaming number used to call the target user.

6. A mobile terminal comprising:

a querying module, configured to:

in response to detecting a dial control instruction specific to a destination number currently obtained by a mobile terminal and in response to determining that the mobile terminal is in an international roaming state, query whether a prestored contact database comprises contact information associated with the destination number, wherein the contact information comprises a contact identifier, a country in which the contact information was originally generated, and a contact number;

a determining module, configured to:

in response to determining that the prestored contact database comprises the contact information associated with the destination number, determining whether the contact information associated with the destination number includes an additional information description field;

in response to determining that the prestored contact database comprises the contact information associated with the destination number, and the contact information associated with the destination number does not include the additional information description field, compare a number format of the contact information with a number format of a network currently accessed by the mobile terminal to determine a country code, and determine, according to the contact information, a first international roaming number used to call a target user corresponding to the destination number, the first international roaming number including the country code; and in response to determining that the prestored contact database comprises the contact information associated with the destination number, and the contact information associated with the destination number includes the additional information description field, determining, according to the contact information, a second international roaming number used to call a target user corresponding to the destination number, the second international roaming number including the country code; and a calling module, configured to call a target user equipment of the target user according to the first international roaming number or the second international roaming number.

7. The mobile terminal according to claim 6, wherein the mobile terminal further comprises:

an obtaining module, configured to: if the prestored contact database does not comprise the contact information associated with the destination number, obtain a call record that is prestored in the mobile terminal and that is associated with the destination number; and a generating module, configured to generate a third international roaming number according to a home location identifier of the destination number and the destination number that are stored in the call record before the calling module calls the target user equipment.

8. The mobile terminal according to claim 6, wherein the contact information associated with the destination number comprises the additional information description field corresponding to the destination number, the additional information description field comprises an original international roaming number of the target user, and the original international roaming number was generated when the mobile terminal detected, while creating the contact information, that a format of an original number used to call the target user complied with a number format of a country in which the mobile terminal was located while the contact information was created; and wherein the determining module is configured to:

determine, according to the original international roaming number, the second international roaming number used to call the target user.

9. The mobile terminal according to claim 8, wherein determining the second international roaming number comprises:

in response to determining that a country code in the original international roaming number matches the network currently accessed by the mobile terminal, determining that the destination number is the second international roaming number used to call the target user; and in response to determining that a country code in the original international roaming number does not match the network currently accessed by the mobile terminal and the original number is the same as the destination number, determining that the original international roaming number is the second international roaming number used to call the target user.

10. The mobile terminal according to claim 8, wherein determining the second international roaming number comprises:

in response to determining that a country code in the original international roaming number matches the network currently accessed by the mobile terminal, determining that the destination number is the second international roaming number used to call the target user; and in response to determining that a country code in the original international roaming number does not match the network currently accessed by the mobile terminal and the original number is different from the destination number, generating a new international roaming number according to the country code and the destination number, and determining that the generated new international roaming number is the second international roaming number used to call the target user.

11. A mobile terminal comprising:
a non-transitory memory;
a processor;
a communications interface; and
a communications bus; wherein the non-transitory memory, the processor, and the communications interface are coupled by using the communications bus and implement mutual communication, and the communications interface is configured to perform wireless communication; and
the processor invokes an executable program code stored in the non-transitory memory to perform the following steps:
    in response to detecting a dial control instruction specific to a destination number currently obtained by the mobile terminal and in response to determining that the mobile terminal is in an international roaming state, querying whether a prestored contact database comprises contact information associated with the destination number, wherein the contact information comprising a contact identifier, a country in which the contact information was originally generated, and a contact number;
    in response to determining that the prestored contact database comprises the contact information associated with the destination number, determining whether the contact information associated with the destination number includes an additional information description field;
    in response to determining that the prestored contact database comprises the contact information associated with the destination number, and the contact information associated with the destination number does not include the additional information description field, comparing a number format of the contact information with a number format of a network currently accessed by the mobile terminal to determine a country code, determining, according to the contact information, a first international roaming number used to call a target user corresponding to the destination number, the first international roaming number including the country code;
    in response to determining that the prestored contact database comprises the contact information associated with the destination number, and the contact information associated with the destination number includes the additional information description field, determining, according to the contact information, a second international roaming number used to call a target user corresponding to the destination number, the second international roaming number including the country code; and
    calling target user equipment of the target user according to the first international roaming number or the second international roaming number.

12. The mobile terminal according to claim 11, wherein the processor is further configured to invoke the executable program code to:
    in response to determining that the prestored contact database does not comprise the contact information associated with the destination number, obtain a call record that is prestored in the mobile terminal and that is associated with the destination number; and
    before calling the target user equipment, generate a third international roaming number according to a home location identifier of the destination number and the destination number that are stored in the call record.

13. The mobile terminal according to claim 11, wherein the contact information associated with the destination number comprises the additional information description field corresponding to the destination number, the additional information description field comprises an original international roaming number of the target user, and the original international roaming number was generated when the mobile terminal detected, while creating the contact information, that a format of an original number used to call the target user complied with a number format of a country in which the mobile terminal was located while the contact information was created; and
    wherein determining the second international roaming number comprises:
        determining, according to the original international roaming number, the second international roaming number used to call the target user.

14. The mobile terminal according to claim 13, wherein determining the second international roaming number comprises:
    in response to determining that a country code in the original international roaming number matches the network currently accessed by the mobile terminal, determining that the destination number is the second international roaming number used to call the target user; and
    in response to determining that a country code in the original international roaming number does not match the network currently accessed by the mobile terminal and the original number is the same as the destination number, determining that the original international roaming number is the second international roaming number used to call the target user.

15. The mobile terminal according to claim 13, wherein determining the second international roaming number comprises:
    in response to determining that a country code in the original international roaming number matches the network currently accessed by the mobile terminal, determining that the destination number is the second international roaming number used to call the target user; and
    in response to determining that a country code in the original international roaming number does not match the network currently accessed by the mobile terminal and the original number is different from the destination number, generating a new international roaming number according to the country code and the destination number, and determining that the generated new international roaming number is the second international roaming number used to call the target user.

\* \* \* \* \*